(12) United States Patent
Kai et al.

(10) Patent No.: US 7,378,972 B2
(45) Date of Patent: May 27, 2008

(54) RFID TAG

(75) Inventors: Manabu Kai, Kawasaki (JP); Toru Maniwa, Kawasaki (JP); Takashi Yamagajo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 252 days.

(21) Appl. No.: 11/412,926

(22) Filed: Apr. 28, 2006

(65) Prior Publication Data

US 2007/0109131 A1 May 17, 2007

(30) Foreign Application Priority Data

Nov. 16, 2005 (JP) ............................. 2005-331361
Jan. 24, 2006 (JP) ............................. 2006-014968

(51) Int. Cl.
*G08B 13/14* (2006.01)
(52) U.S. Cl. ............................. 340/572.7; 340/572.8; 340/572.1
(58) Field of Classification Search ............ 340/572.1, 340/572.4, 572.7, 572.8, 531; 235/383, 385; 343/795; 435/6, 287.1, 288.1
See application file for complete search history.

(56) References Cited

U.S. PATENT DOCUMENTS

| | | | | |
|---|---|---|---|---|
| 6,127,989 | A | 10/2000 | Kunz | 343/895 |
| 6,806,842 | B2 * | 10/2004 | King et al. | 343/795 |
| 7,248,221 | B2 * | 7/2007 | Kai et al. | 343/700 MS |
| 2004/0052202 | A1 | 3/2004 | Brollier | |
| 2005/0093678 | A1 * | 5/2005 | Forster et al. | 340/10.1 |

FOREIGN PATENT DOCUMENTS

| | | |
|---|---|---|
| EP | 1434301 A1 | 6/2004 |
| JP | A-2003-141650 | 5/2003 |
| WO | WO 00/23994 | 4/2000 |

OTHER PUBLICATIONS 06008871.3-1248, Extended European Search Report, Mar. 16, 2007.

* cited by examiner

*Primary Examiner*—Van T. Trieu
(74) *Attorney, Agent, or Firm*—Bingham McCutchen LLP

(57) ABSTRACT

In an RFID tag, a ground portion attached to a magnetic recording medium so as to be electromagnetically coupled to a metal surface inside the magnetic recording medium in a high-frequency band, a monopole portion provided on a same plane as the ground portion and inside the ground portion, and a feeding portion connected to one end of the monopole portion and mounting thereon an LSI chip are provided. The ground portion has a ring shape, the monopole portion bent along the ring shape has a length for impedance matching with the feeding portion, and this length can be adjusted by providing a folded portion or a meander portion. Alternatively, the monopole portion may be decentered from the ground portion so as to locate a vicinity of the feeding portion away from the ground portion and to bring a vicinity of the tip portion near to the ground portion, in which case an adjusting portion can be provided at the tip portion of the monopole portion.

16 Claims, 21 Drawing Sheets

2 MONOPOLE PORTION (ANTENNA)
1 GROUND PORTION
5 SHEET

3 FEEDING PORTION (CHIP)
1 GROUND PORTION
SHEET 5
2 MONOPOLE PORTION
4 FOLDED MONOPOLE PORTION

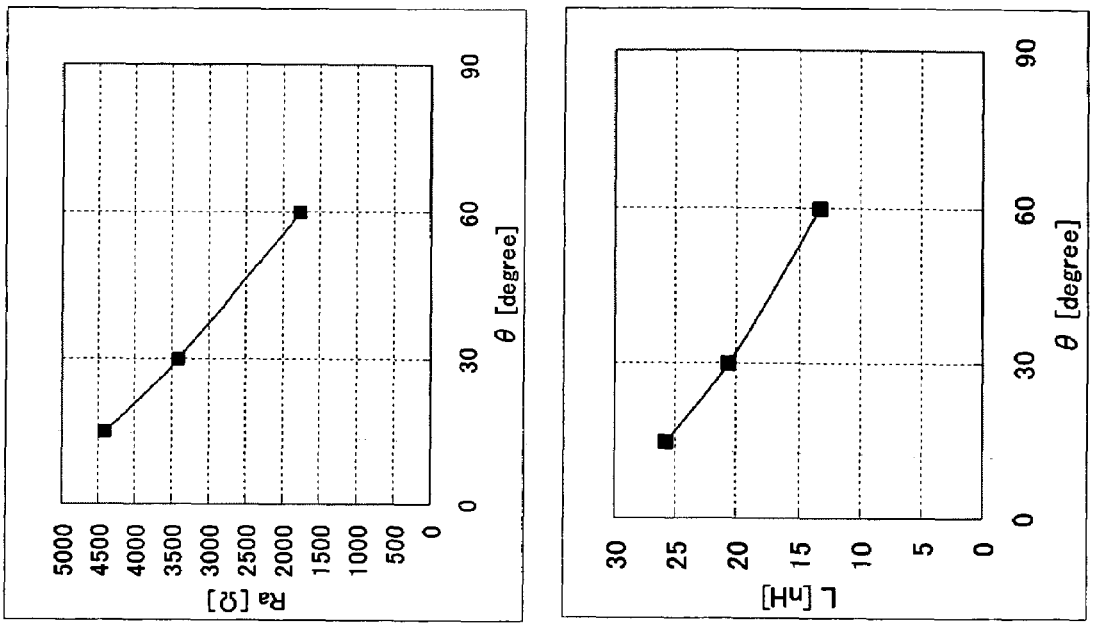
FIG. 10B
FIG. 10C
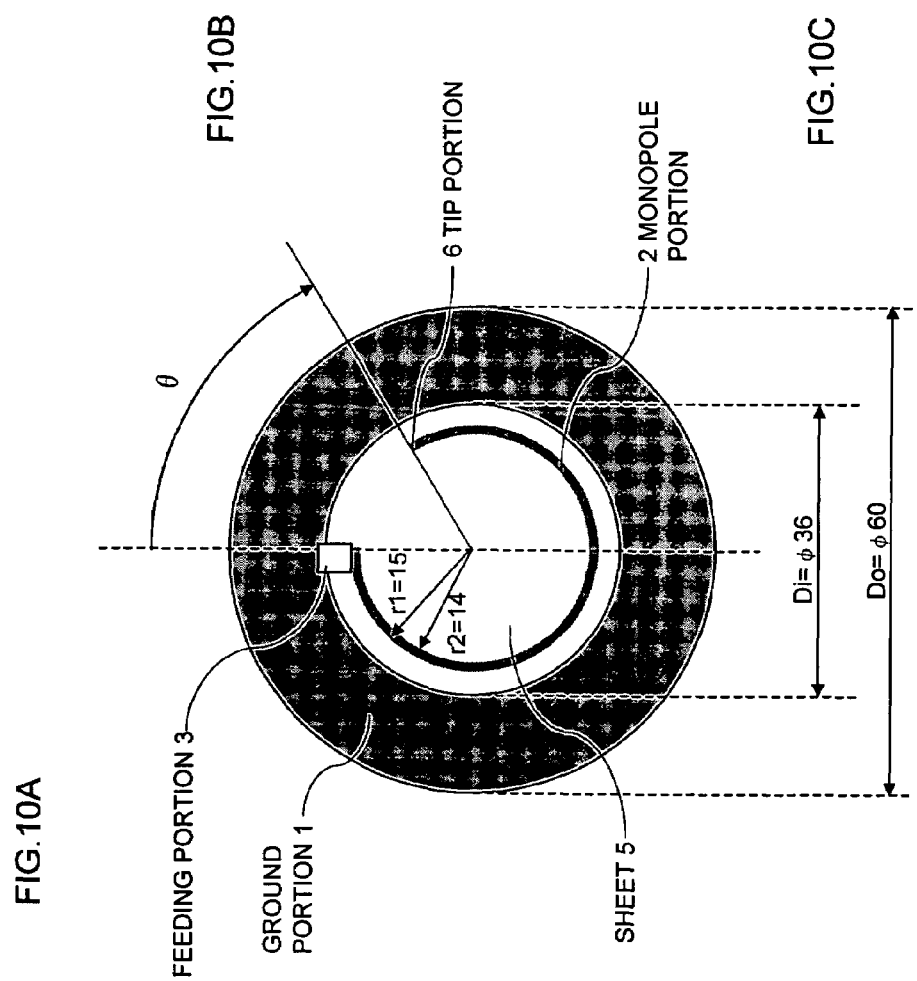
FIG. 10A

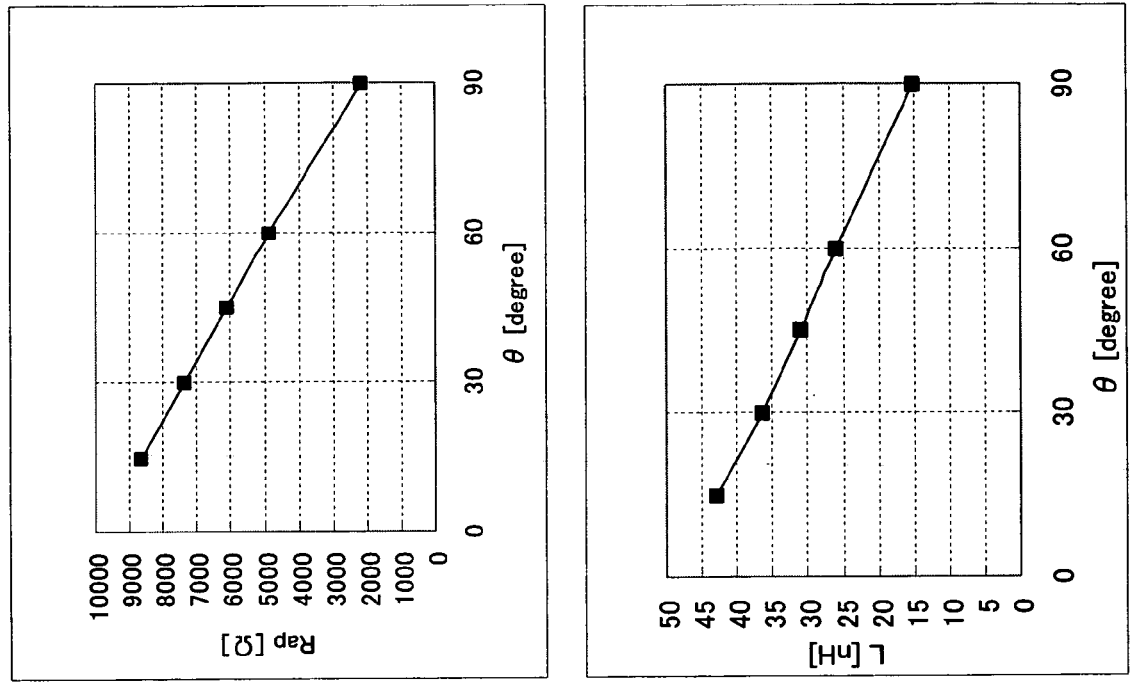
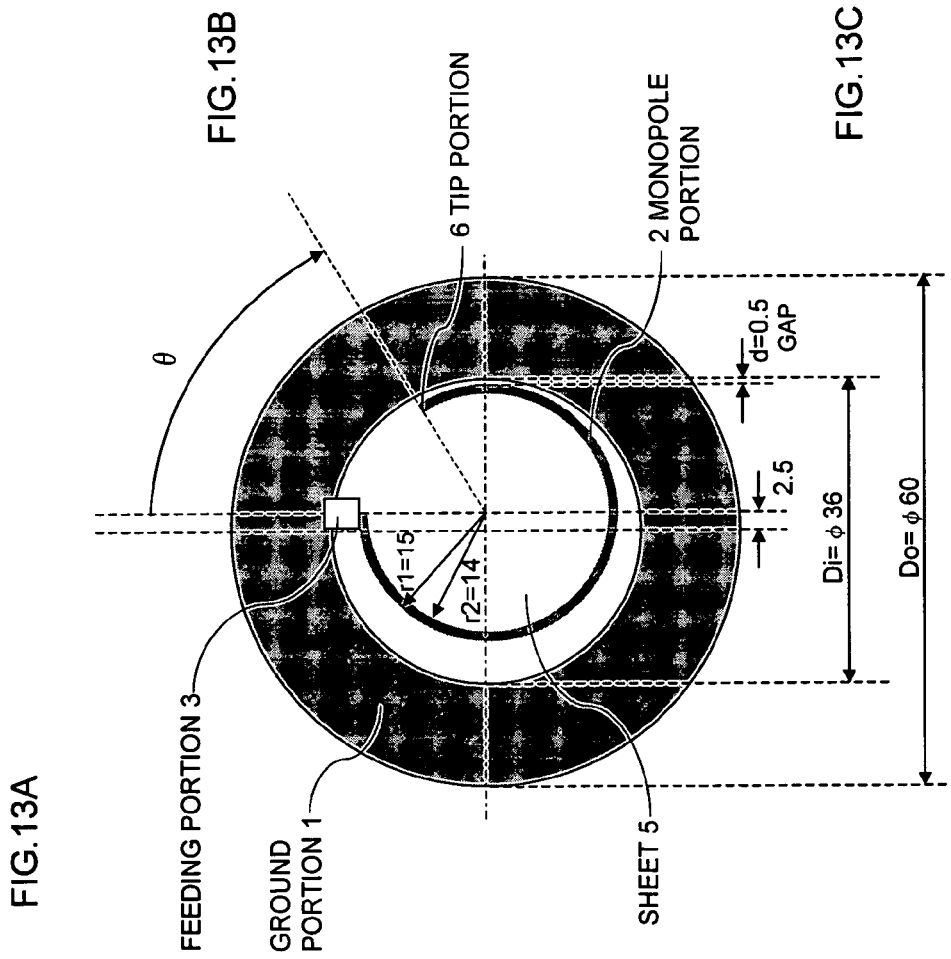
FIG.13A
FIG.13B
FIG.13C

31 DIPOLE

32 FOLDED DIPOLE

32 FOLDED DIPOLE

15mm

145mm ($\lambda/2$)

INDUCTANCE PORTION 33

RFID TAG

BACKGROUND OF THE INVENTION

1. Field of the Invention

The present invention relates to an RFID tag, and in particular to a noncontact RFID tag for a transmission/reception to/from an RFID reader/writer.

2. Description of the Related Art

An RFID system has been already known in which a reader/writer transmits a signal of approximately 1 W via a radio line of a UHF bandwidth (860-960 MHz), and a tag receives the signal and returns a response signal to the reader/writer, thereby enabling information within the tag to be read by the reader/writer. It is stipulated that the communication frequency is 953 MHz, whereby the communication distance is approximately 3 m, while it depends on the gain of an antenna provided on the tag and the operation voltage and a peripheral environment of a chip. The tag is composed of an antenna approximately 0.1 mm thick and an LSI chip (whose size is approximately 1 mm square and 0.2 mm thick) connected to an antenna feeding point.

As shown in FIG. 18, an LSI chip 21 can be equivalently represented by a parallel circuit of an internal resistance Rc (e.g. 1200 Ω) and a capacitance Cc (e.g. 0.7 pF). An admittance Yc (=1/Rc+jwCc) of the chip 21 is indicated at a position A21 on an admittance chart of FIG. 19. On the other hand, an antenna 22 can be equivalently represented by a parallel circuit of a radiation resistance Ra (e.g. 500 Ω) and an inductance La (e.g. 40 nH).

By connecting the chip 21 to the antenna 22 in parallel, the capacitance Cc and the inductance La resonate with each other and make impedance matching at a desired resonant frequency fo (the above-mentioned 953 MHz), so that the maximum reception power at the antenna 22 is supplied to the chip 21, as seen from the following equation.

$$fo = \frac{1}{2\pi\sqrt{LC}} \quad \text{Eq. (1)}$$

As a basic antenna used for an RFID tag, a dipole antenna approximately 145 mm (λ/2) long shown in FIG. 20A can be mentioned. The impedance in this case plots a track (1) in FIG. 19. At fo=953 MHz, Ra assumes 72 Ω and the imaginary part assumes 0, which are indicated at a position A31 on the track (1).

Since the radiation resistance Ra required for the antenna of the RFID tag is as extremely high as approximately 500-2000 Ω, the radiation resistance Ra is required to be raised from 72 Ω.

It is well known that with a folded dipole antenna 32 approximately 145 mm long as shown in FIG. 20B the radiation resistance Ra is raised from 72 Ω of the dipole antenna to approximately 300 Ω-500 Ω, depending on a line width. FIG. 19 shows that the impedance of the folded dipole antenna 32 plots a track (2), and at fo=953 MHz, Ra assumes 500 Ω and the imaginary part assumes 0, which are indicated at a position A32 on the track (2).

Furthermore, by connecting an inductance portion 33 in parallel to the folded dipole antenna 32 shown in FIG. 20B as shown in FIG. 20C, the track (2) on the admittance chart of FIG. 19 is rotated counterclockwise, so that the impedance can be indicated at a position A33 on the track (3) with an imaginary component (Ba=−1/ω La) of the same absolute value as the imaginary component (Bc=ω Cc) of the admittance of the chip 21. In this case, the shorter the length of the inductance portion 33 becomes, the smaller the value of the inductance La becomes, which leads to a large imaginary component and a large rotation amount.

Since the imaginary component Bc of the chip 21 has the same magnitude as that of the imaginary component Ba of the antenna 22, they are cancelled mutually and the resonance occurs at the frequency fo. The canceling of the imaginary components is the most important element upon designing an RFID tag. Although matching between the internal resistance Rc of the chip 21 and the radiation resistance Ra of the antenna 22 is the most preferable, it is not necessary to strictly match them with each other.

On the other hand, there is proposed an anti-theft article identification label in which a tag as mentioned above is attached to a magnetic medium such as a CD and a DVD. The anti-theft article identification label comprises an anti-theft tag portion for monitoring a movement of an article, and an RFID tag portion for which read and write of information by a radio communication is enabled for performing an individual identification of an article (see patent document 1). [Patent document 1] Japanese Patent Application Laid-open No. 2003-141650

However, as shown in FIGS. 21A and 21B, in a CD (compact disk) or DVD 10 composed of a label surface 11, a recording surface 12, and a dielectric (polycarbonate) 13 which intervenes between the surfaces 11 and 12, the metal of the recording surface 12 occupies a large part. Therefore, if the prior art folded dipole antenna shown in FIG. 20C is used for such a large tag attached to the magnetic recording medium such as a CD or a DVD, it is disadvantageous that the metal surface reflects a radio wave, resulting in extreme deterioration of the communication distance.

SUMMARY OF THE INVENTION

It is accordingly an object of the present invention to provide an RFID tag whose communication distance does not deteriorate even if the tag is provided in a magnetic recording medium such as a CD and a DVD.

In order to achieve the above-mentioned object, an RFID tag according to the present invention comprises: a ground portion attached to a magnetic recording medium so as to be electromagnetically coupled to a metal surface inside the magnetic recording medium in a high-frequency band; a monopole portion provided on a same plane as the ground portion and inside the ground portion; and a feeding portion provided between one end of the monopole portion and the ground portion, and capable of mounting thereon a chip.

The most significant point of this invention is to make a magnetic recording medium that is a metal part of the CD, DVD, or the like serve as a ground layer of an antenna in an RFID tag. Namely, the metal surface, which is generally an archenemy for the RFID tag is reversely used, and electromagnetically coupled (short-circuited) in a high-frequency band, thereby making the metal surface serve as the ground layer of the RFID tag.

The above-mentioned ground portion may have a ring shape.

Also, the above-mentioned monopole portion may be bent along the ring shape.

Also, the above-mentioned monopole portion may have a length for impedance matching with the feeding portion. The length may be adjusted by providing a folded portion or a meander portion.

Furthermore, the above-mentioned ground portion may have an outer diameter larger than an inner diameter of the metal surface on its upper side so as to substantially cover the metal surface, and may be attached to the magnetic recording medium separated from the metal surface. Namely, the ground portion at least partially covers the metal surface to facilitate an electromagnetic coupling.

Also, the above-mentioned ground portion may be attached on a label surface of the magnetic recording medium, may be connected to the metal surface on a same plane as the metal surface and inside the metal surface, or may be formed integrally with the metal surface.

Also, the above-mentioned ground portion and the monopole portion may comprise conductors consisting of any of Cu, Ag, and Al, and may be fixed on a sheet consisting of any of PET, film, and paper.

Also, the above-mentioned magnetic recording medium may comprise e.g. a CD or a DVD, and the above-mentioned metal surface may comprise a recording surface.

Also, the above-mentioned monopole portion may have a ring shape which is concentric with the ground portion and has a notched portion at a tip portion.

Also, the above-mentioned monopole portion may have a ring shape notched at a tip portion, and the ring shape may be decentered from the ground portion so as to locate a vicinity of the feeding portion away from the ground portion and to bring a vicinity of the tip portion near to the ground portion.

Thus, a gain in a far field of the RFID tag can be increased.

Furthermore, an adjusting portion for adjusting a length for impedance matching with the feeding portion may be provided at the tip portion of the monopole portion. Since the monopole portion and the ground portion are decentered as mentioned above, it becomes unnecessary to fold the adjusting portion from the tip portion as mentioned above, thereby enabling the adjusting portion to be provided easily.

Since the metal surface of the magnetic recording medium of the CD, DVD, or the like can be served as an antenna ground of the RFID tag, a small-sized RFID tag operating with being attached to the magnetic recording medium can be obtained, and the reduction of the communication distance can be avoided in the absence of the reflection of the radio wave due to the metal surface. As a result, the magnetic recording medium of the CD, DVD, or the like having a function readable by the RFID system can be realized.

BRIEF DESCRIPTION OF THE DRAWINGS

The above and other objects and advantages of the invention will be apparent upon consideration of the following detailed description, taken in conjunction with the accompanying drawings, in which the reference numerals refer to like parts throughout and in which:

FIGS. 10A-10C are diagrams showing a dimension example and a calculation result by an electromagnetic field simulator of an embodiment [2] of an RFID tag according to the present invention;

FIGS. 13A-13C are diagrams showing a dimension example and a calculation result by an electromagnetic field simulator of an embodiment [3] of an RFID tag according to the present invention;

FIGS. 21A and 21B are diagrams of A-A sectional view and top view showing a prior art magnetic recording medium of a CD, a DVD, or the like.

DESCRIPTION OF THE EMBODIMENTS

Figure 1A:
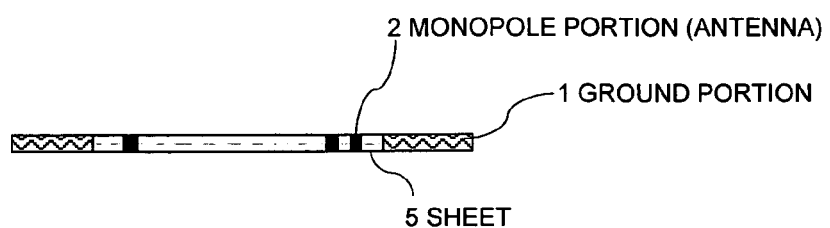
FIGS. 1A and 1B are diagrams of A-A sectional view and top view showing an embodiment [1] of an RFID tag according to the present invention.
Figure 1B:
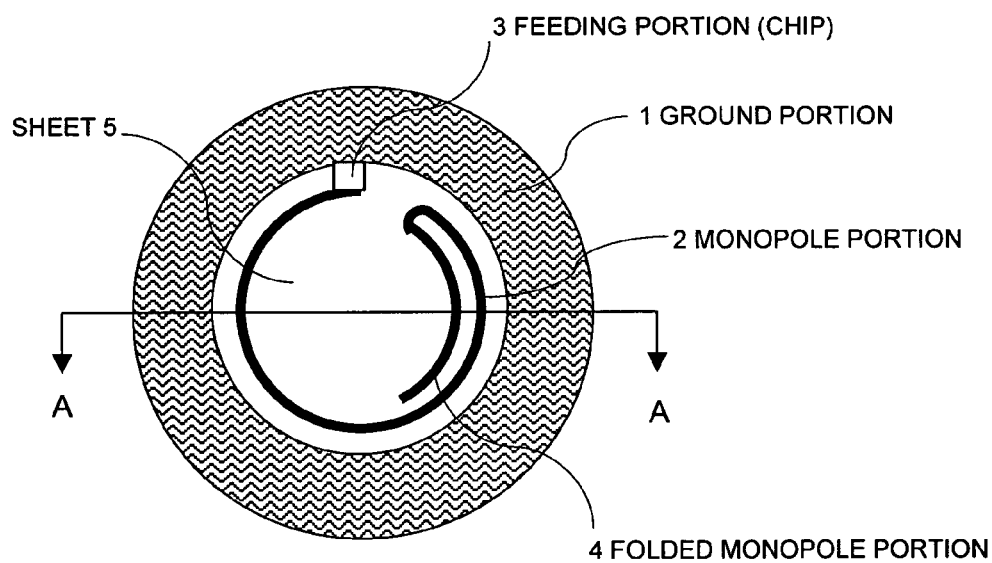

⊚Embodiment [1] of RFID Tag: FIGS. 1A and 1B

FIGS. 1A and 1B show an embodiment of an RFID tag according to the present invention. This RFID tag is provided with a monopole portion 2 inside a ring-shaped (doughnut-like) plane ground portion 1 and on the same plane as the ground portion 1, and with a feeding portion 3 which can mount thereon an LSI chip between one end of the monopole portion 2 and the ground portion 1. Namely, the RFID tag of the present invention secures the feeding portion 3, which can also include the state before mounting the LSI chip, which then substantially serves as an antenna, on the feeding portion 3.

The other end of the monopole portion 2 has a folded portion 4. The ground portion 1 and the monopole portion 2 are fixed on a sheet 5, providing a space between them. Also, the ground portion 1 and the monopole portion 2 are conductors consisting of any of Cu, Ag, and Al, the sheet 5 consists of any of PET, film, and paper.

Figure 2A:
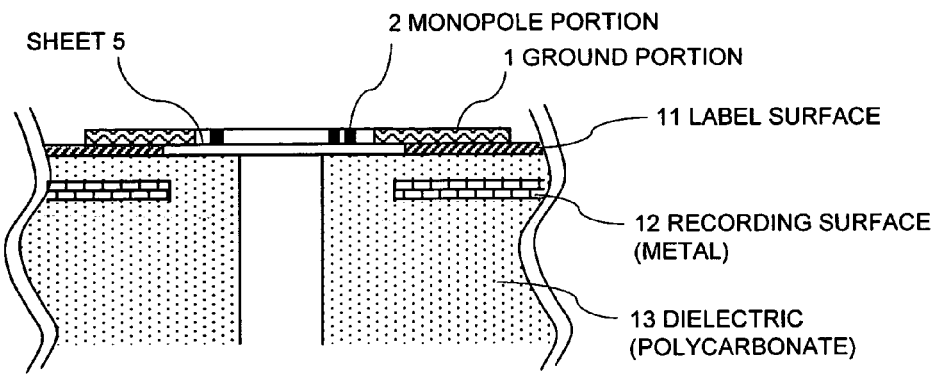
FIGS. 2A and 2B are diagrams of A-A sectional view and top view showing a mounting example [1] to a CD of an RFID tag according to the present invention.
Figure 2B:
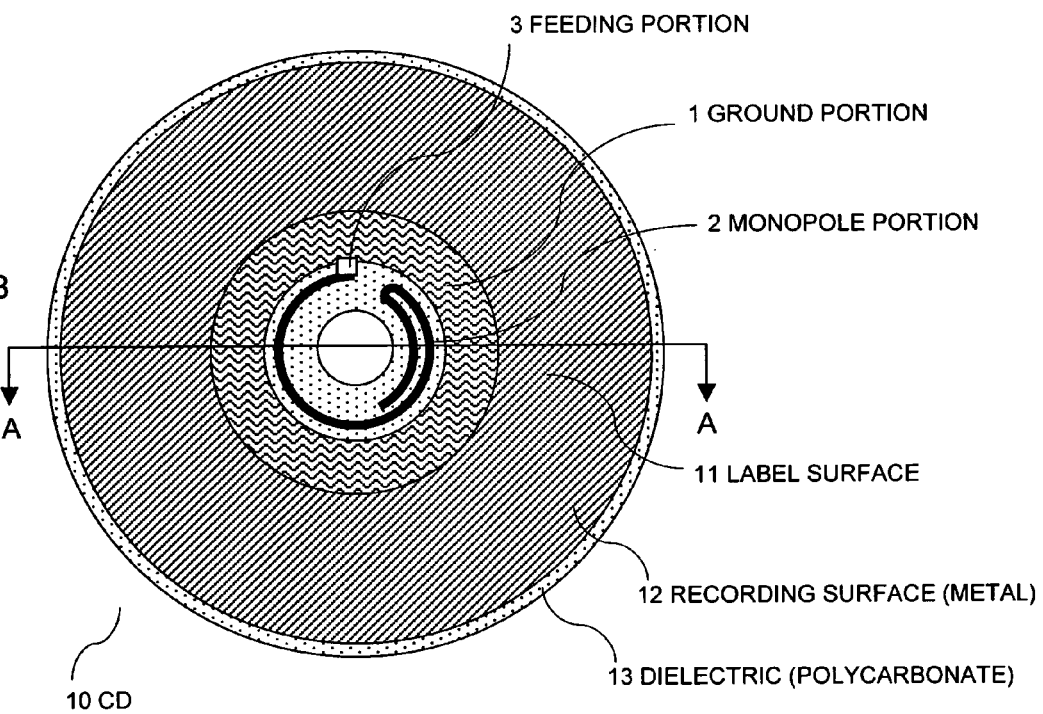

RFID Tag Example [1] as Mounted on CD: FIGS. 2A and 2B

Figure 21A:
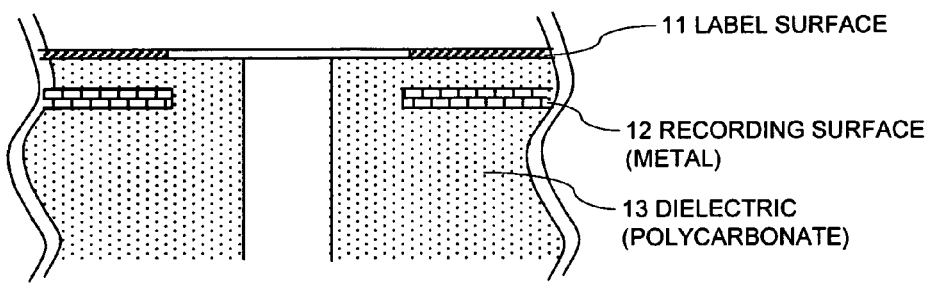
Figure 21B:
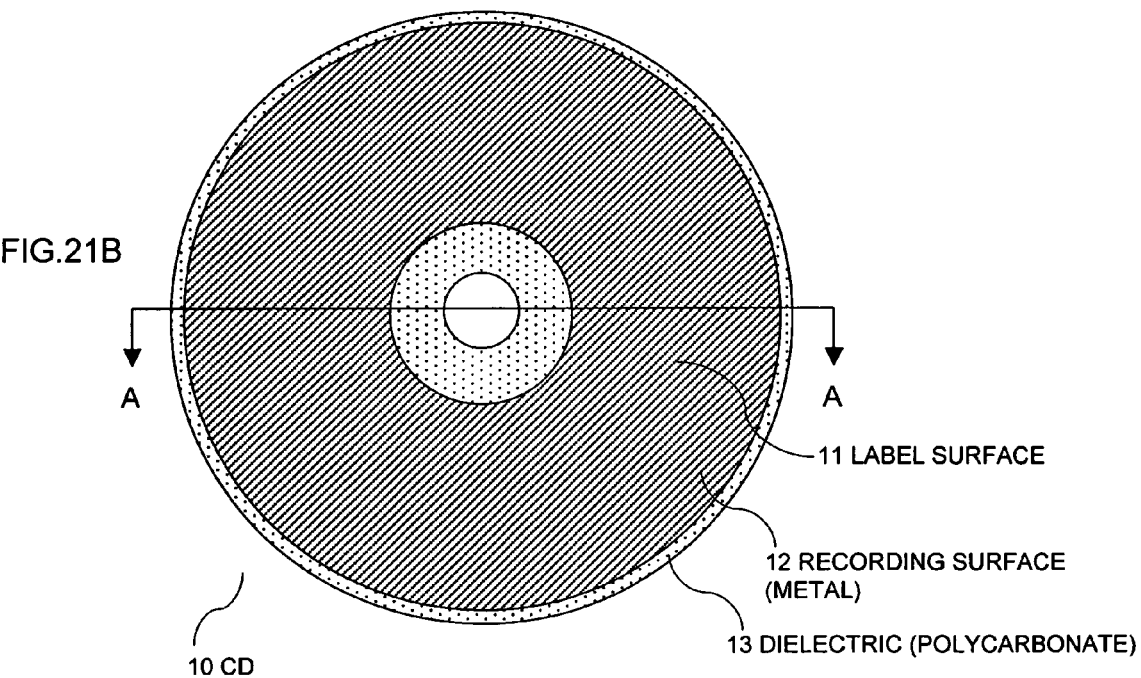

FIGS. 2A and 2B show a state where an embodiment [1] of the RFID tag according to the present invention shown in FIGS. 1A and 1B is mounted on a magnetic recording medium such as a CD. Namely, the RFID tag shown in FIGS. 1A and 1B is attached on the upper side of the label surface 11 of the CD 10 shown in FIGS. 21A and 21B. Since the metal recording surface 12 is below the under side of the label surface 11 and serves as a reading surface of a CD player, nothing can be formed below the label surface 11. It is to be noted that polycarbonate is filled inside the inner diameter of the metal surface 12.

Figure 3:
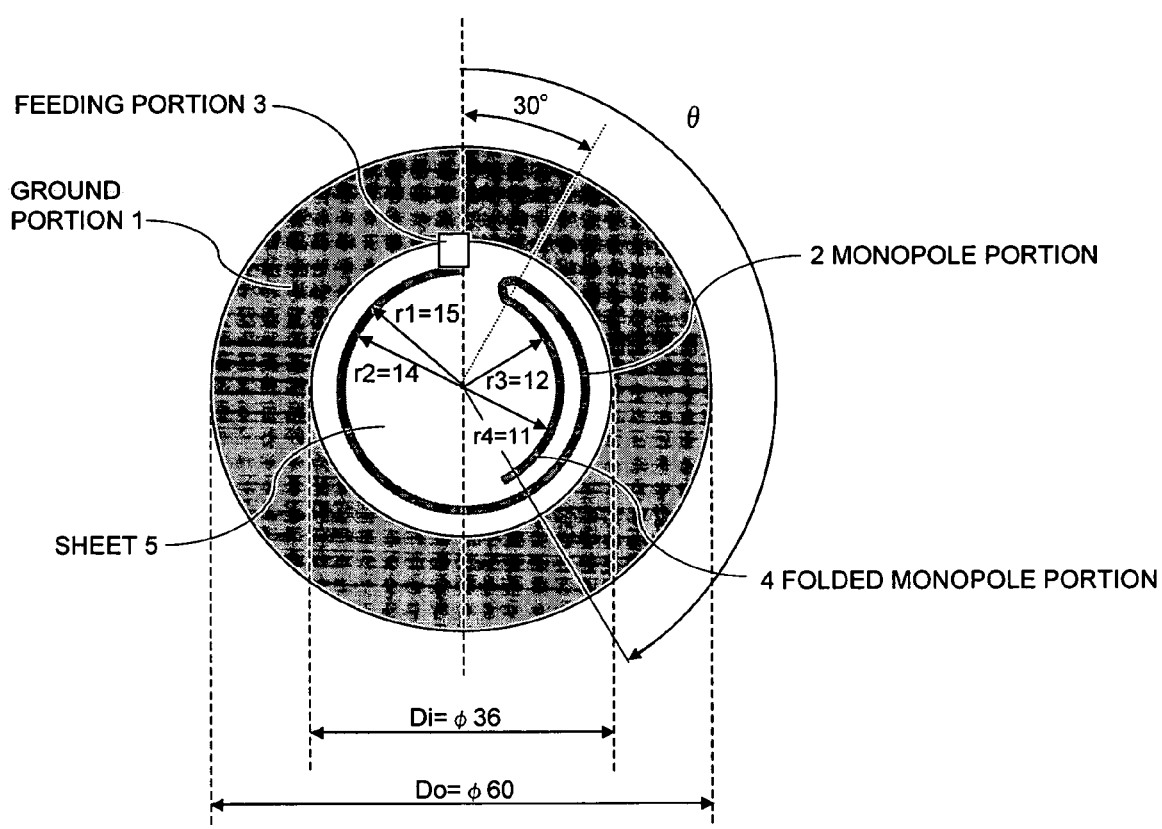
FIG. 3 is a top view showing a dimension example of an embodiment [1] of an RFID tag according to the present invention.

FIG. 3 shows a specific form (dimension example) when the RFID tag shown in FIGS. 1A and 1B is mounted on the CD 10 as shown in FIGS. 2A and 2B. The inner diameter of the metal surface 12 of the CD or the DVD is approximately Φ38 mm. Therefore, in conformity with this, an inner diameter Di of the ground portion 1 is made Φ36 mm a little smaller and an outer diameter Do is made Φ60 mm so as to sufficiently cover the metal surface 12.

The distance between the ground portion 1 and the CD metal surface 12 is approximately 0.1-0.6 mm, extremely thin in FIG. 2A. Also, the part where the ground portion 1 covers the CD metal surface 12 is sufficiently large (a ring of 12 mm in width in this embodiment). Therefore, the ground portion 1 and the CD metal surface 12 are electromagnetically coupled in a high-frequency band of the above-mentioned resonant frequency fo=953 MHz, but not coupled on a direct current basis. Namely, the metal part 12 of the CD 10 is reversely used as an antenna ground of the RFID tag.

Figure 19:
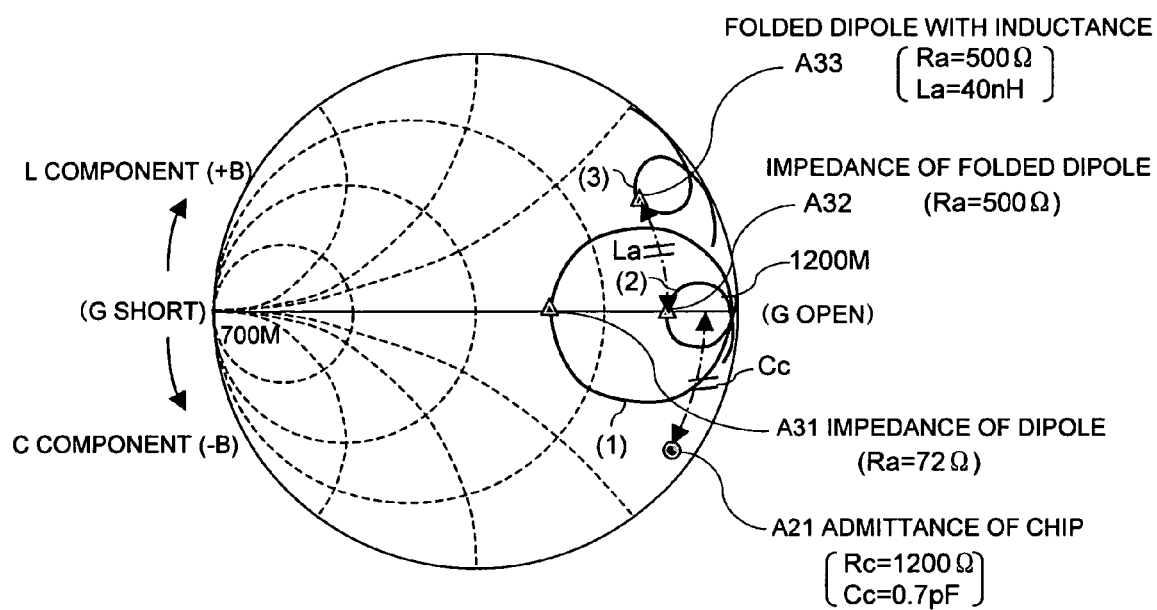
FIG. 19 is an admittance chart (700 MHz-1200 MHz: fo=953 MHz) of an RFID tag when various antennas are used.

In addition, the monopole antenna portion 2 generally requires a λ/4 length (fo=953 MHz and approximately 76 mm in space) which is one-half of the dipole. However, if the monopole portion 2 is made longer than the required length, it rotates clockwise along the track (1) in FIG. 19. As a result, it behaves as if an inductance is connected in parallel. Also, the monopole portion 2 is formed as shown in FIG. 3 with a width of 1 mm (r1-r2).

Figure 4A:
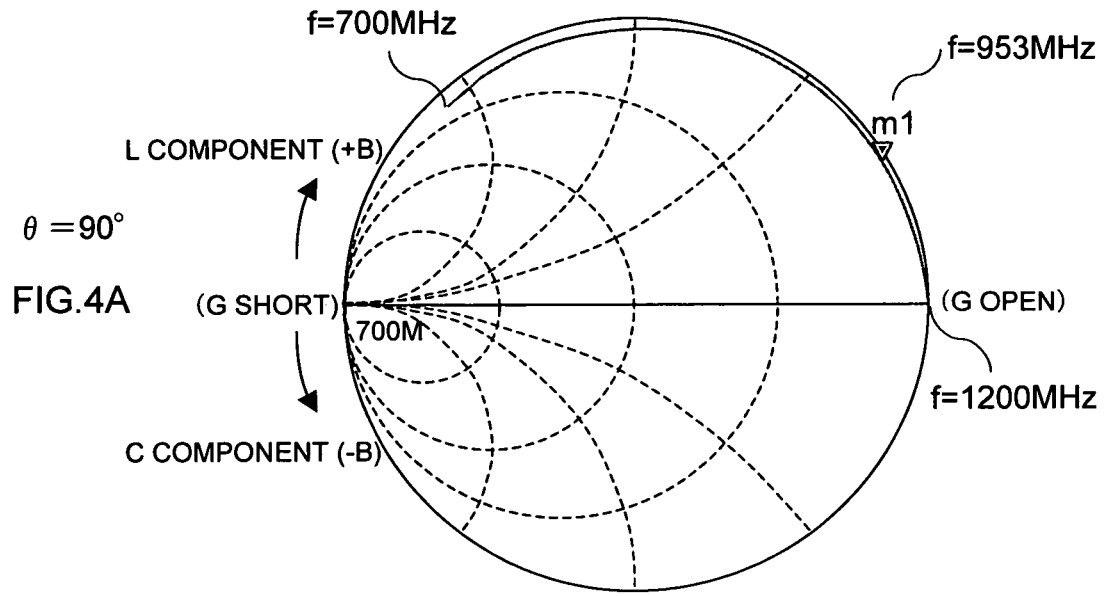
FIGS. 4A and 4B are admittance charts with a variation of θ in the folded portion shown in FIG. 3.
Figure 4B:
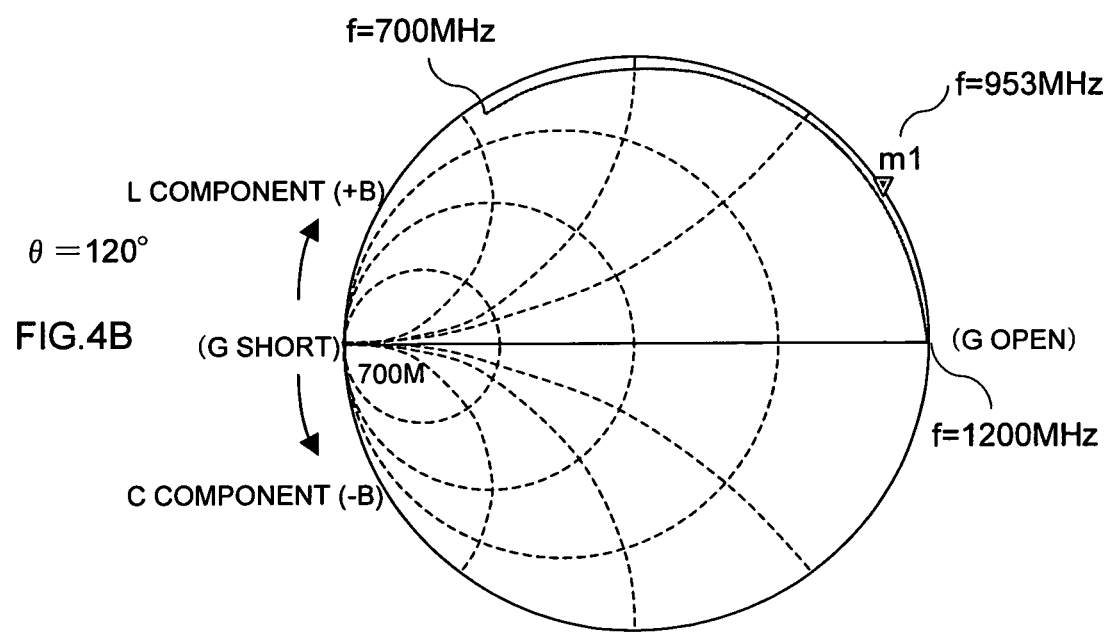

Furthermore, an adjustment with the chip feeding portion 3 is performed by an angle θ of the folded monopole portion 4. FIG. 4A shows an admittance chart in case of θ=90° while FIG. 4B shows the admittance chart in case of θ=120°. The radiation resistance Ra and the inductance La are obtained at fo=953 MHz in FIGS. 4A and 4B.

Figure 5A:
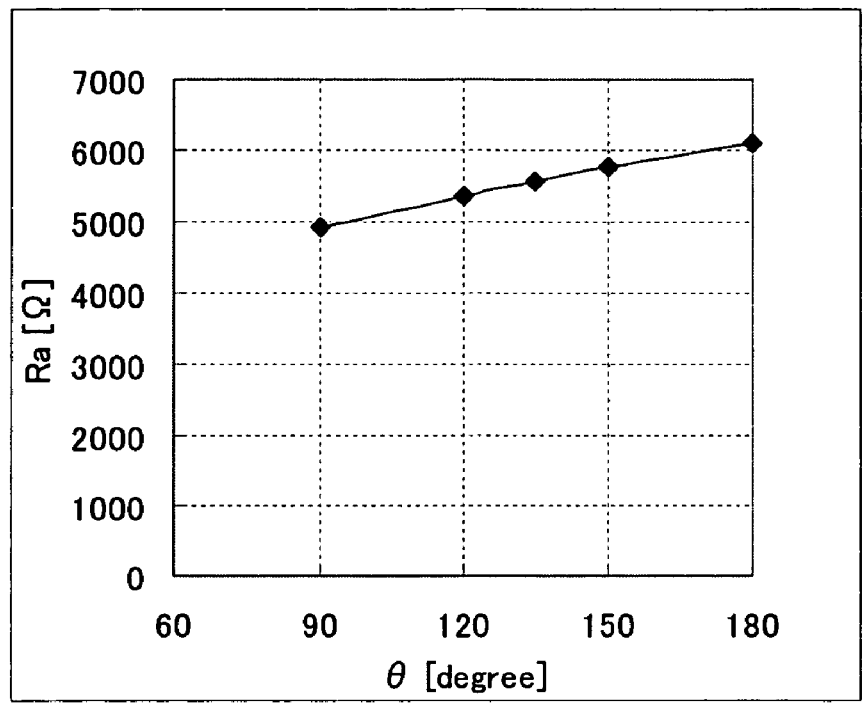
FIGS. 5A and 5B are graphs showing a calculation result by an electromagnetic simulator by using the dimension example of FIG. 3.
Figure 5B:
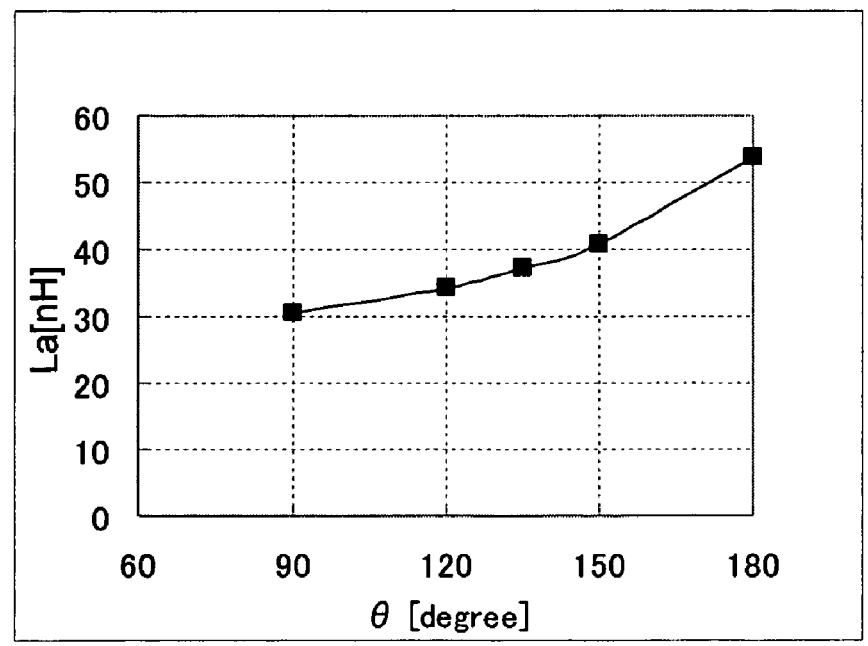

FIGS. 5A and 5B respectively show graphs for the radiation resistance Ra and the inductance La where with respect to the point of fo=953 MHz an electromagnetic field simulator commercially available inputs thereinto a frequency (700-1200 MHz), a pattern dimension, a thickness of the substrate as parameters by varying antenna patterns θ from 90° to 180°, to be calculated and plotted.

From FIGS. 5A and 5B, the radiation resistance Ra and the inductance La of the antenna for the angle θ can be obtained. Supposing that Cc of the chip 3 is 0.7 pF, it resonates with the inductance La=40 nH at fo=953 MHz. Therefore, it is seen from FIG. 5B that θ should be 150°. Although Ra is 5800 Ω at θ=150°, which is several times as much as the resistance Rc of the chip 3=1200 Ω referring to FIG. 5A, sufficient power is supplied to the chip 3 even if there is some impedance mismatching.

Figure 6A:
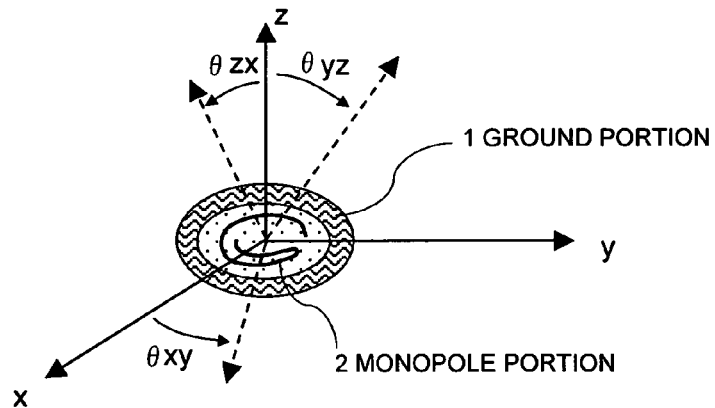
FIGS. 6A and 6B are diagrams showing a directional pattern and an antenna gain of an RFID tag concerning the RFID tag of FIG. 3.
Figure 6B:
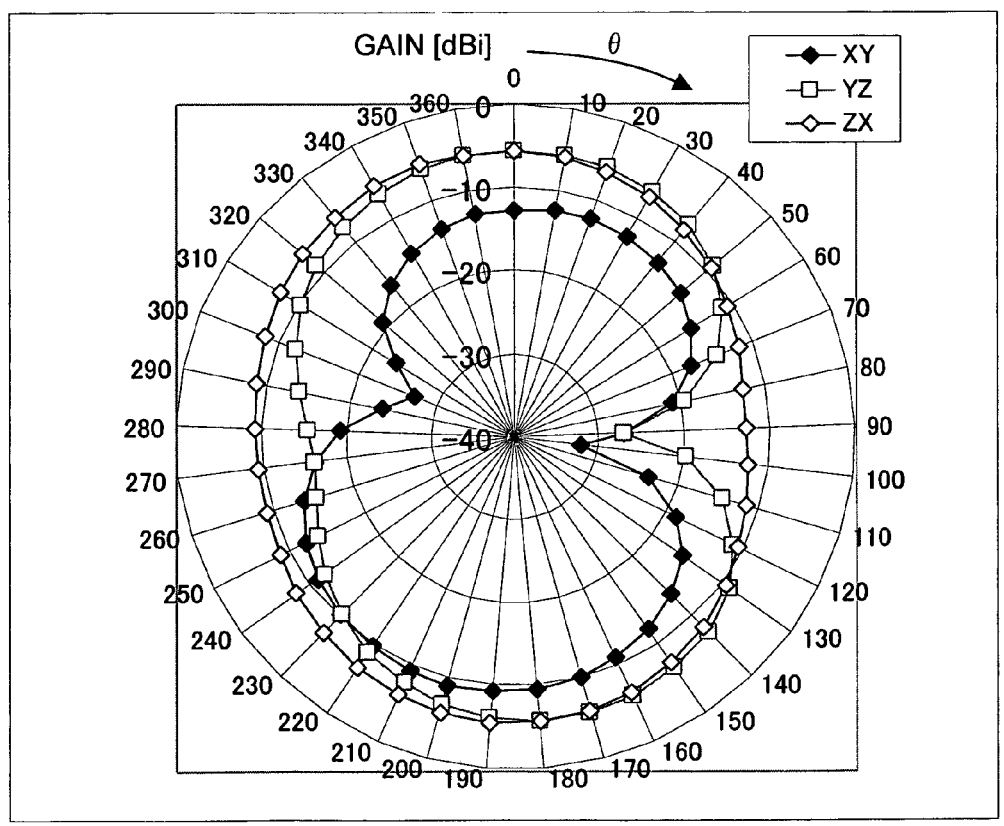

Also, by a coordinate system shown in FIG. 6A, an antenna gain by a directivity pattern shown in FIG. 6B is calculated. The gain is −5--6 dBi for the CD 10 in a direction of the front (YZ), and the communication distance assumes 40% of a general folded dipole, assuming that the gain is 2 dBi. As a result of a trial production and evaluation by actually using an electrically conductive tape, it has been confirmed that the operation with 39% communication distance of the elongate folded dipole is performed.

When the RFID tag is applied to the RFID system of 2.45 GHz, a wavelength assumes 953 (MHz)/2450 (GHz). Therefore, it is needless to say that the length of the monopole portion 2 can be shortened and the folded monopole portion 4 becomes unnecessary.

Figure 7A:
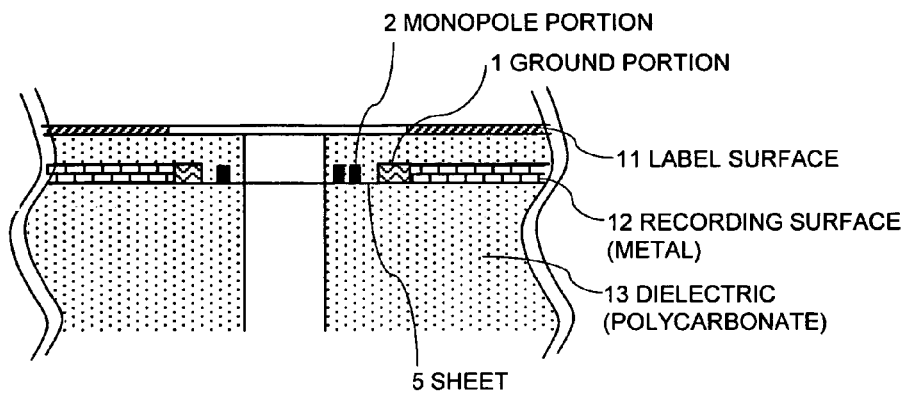
FIGS. 7A and 7B are diagrams of A-A sectional view and top view showing a mounting example [2] to a CD of an RFID tag according to the present invention.
Figure 7B:
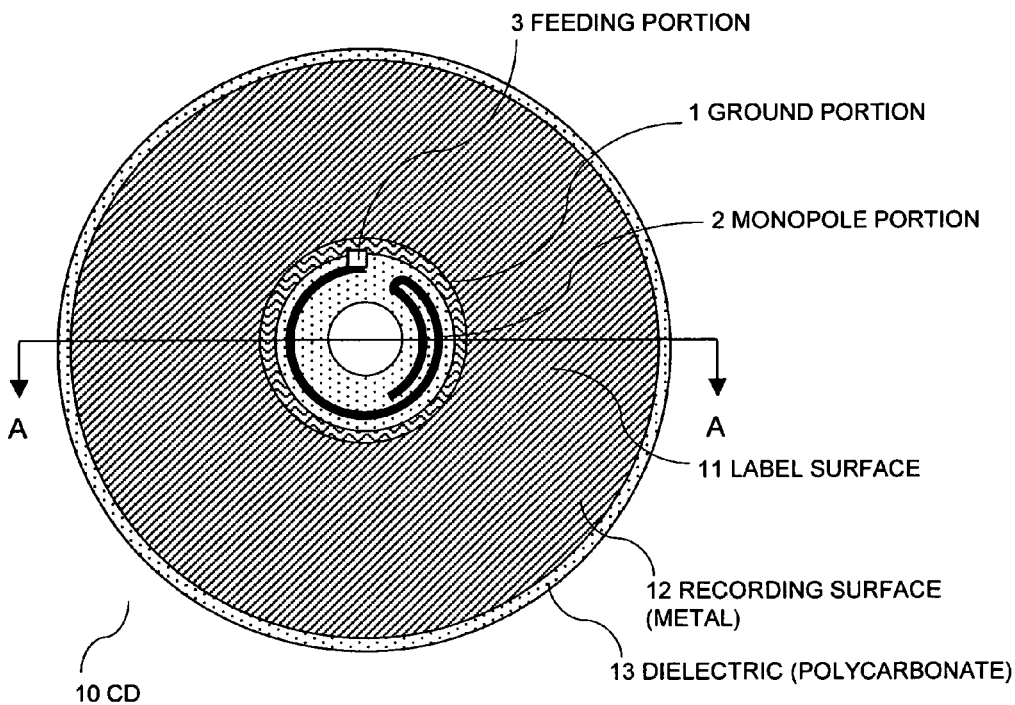

RFID Tag Example [2] as Mounted on CD: FIGS. 7A and 7B

The above-mentioned RFID tag may be installed in the CD 10 from the beginning. Namely, as shown in FIGS. 7A and 7B, it is possible that the ground portion 1 and the metal surface 12 are arranged on the same plane, being mutually connected inside the plane. In this case, polycarbonate is filled between the ground portion 1 and the monopole portion 2.

Figure 8A:
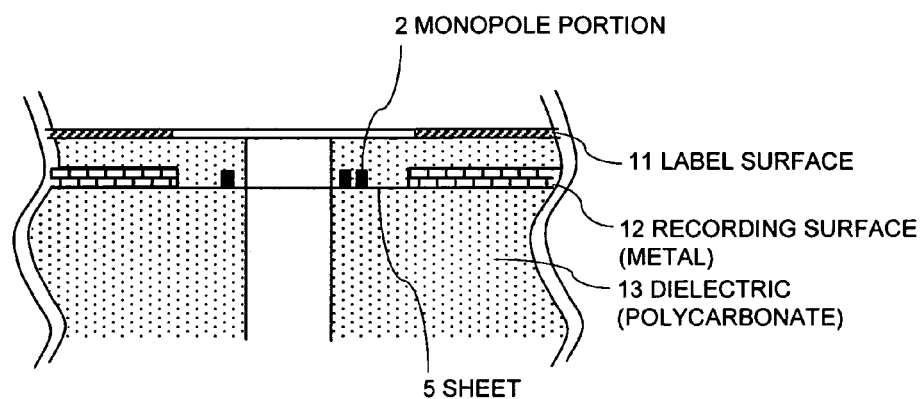
FIGS. 8A and 8B are diagrams of A-A sectional view and top view showing a mounting example [3] to a CD of an RFID tag according to the present invention.
Figure 8B:
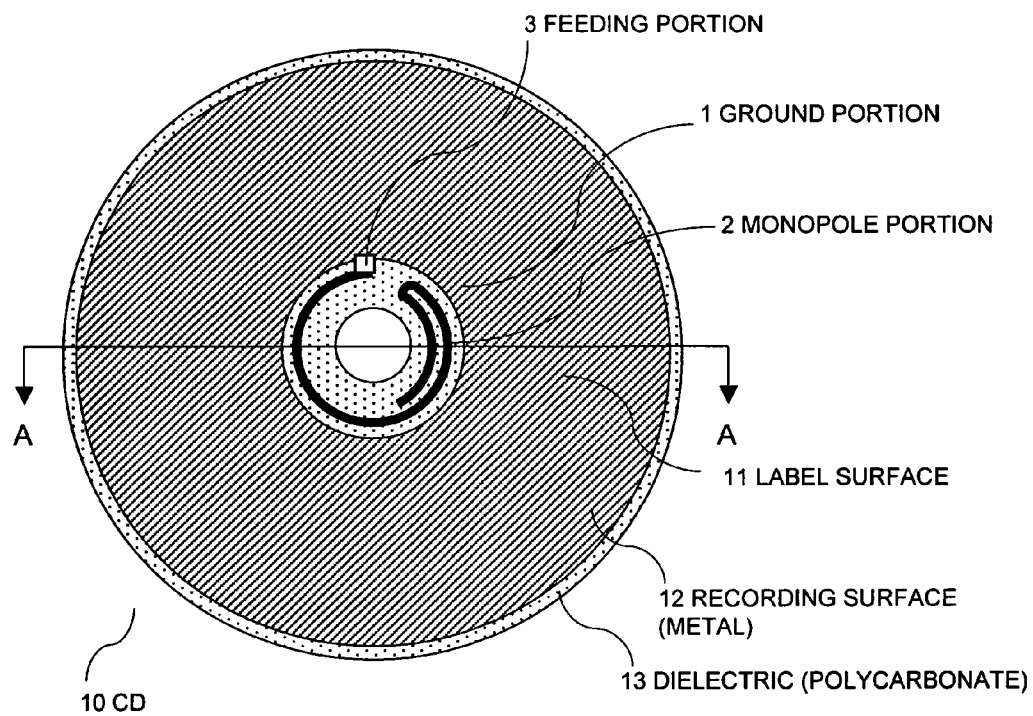

RFID Tag Example [3] as mounted on CD: FIGS. 8A and 8B

Alternatively, as shown in FIGS. 8A and 8B, the ground portion 1 of the RFID tag may be used for the metal surface 12 itself of the CD 10.

It is to be noted that the above-mentioned mounting examples [1]-[3] can be similarly applied to the following embodiments [2]-[5].

Figure 9A:
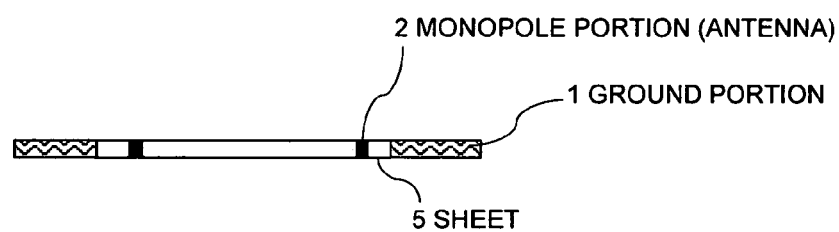
FIGS. 9A and 9B are diagrams of A-A sectional view and top view showing an embodiment [2] of an RFID tag according to the present invention.
Figure 9B:
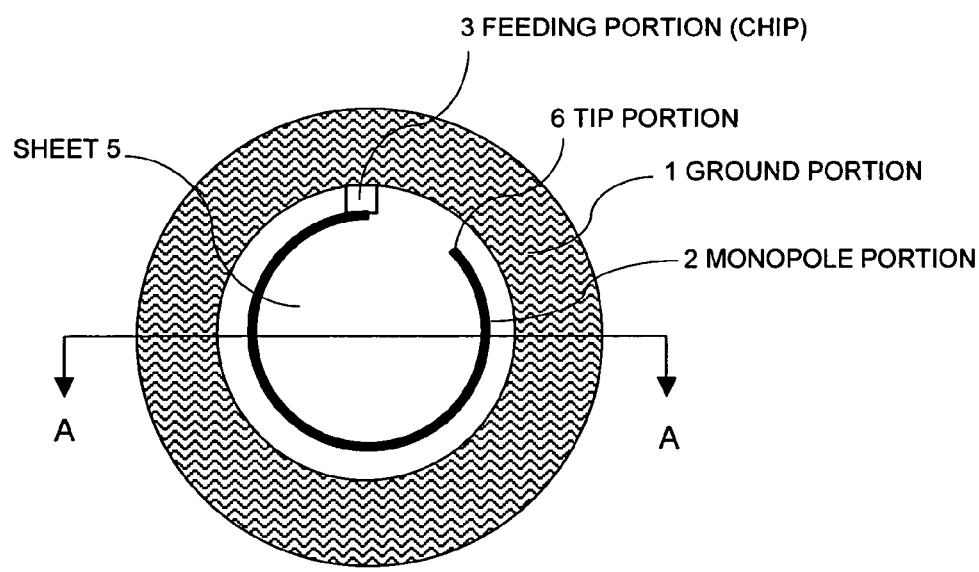

⊚Embodiment [2] of RFID Tag: FIGS. 9A and 9B

This embodiment [2] is different from the embodiment [1] shown in FIGS. 1A and 1B in that the folded monopole portion 4 provided in the monopole portion 2 is eliminated, as shown in FIGS. 9A and 9B.

Namely, the above-mentioned embodiment [1] is premised on that the capacitance Cc of the chip 3=0.7 pF and the inductance La=40 nH resonate at the frequency fo=953 MHz. Therefore, the folded monopole portion 4 with θ=150° in FIG. 3 is required. In this embodiment [2], the folded monopole portion 4 can be eliminated by setting the capacitance Cc of the chip 3 to 1.4 pF.

This will now be described referring to a dimension example and calculation results by the electromagnetic simulator shown in FIGS. 10A-10C.

As shown in FIG. 10A, an outer radius r1=15 and an inner radius r2=14 in the monopole portion, and the inner diameter Di=Φ36 and the outer diameter Do=Φ60 in the ground portion 1 are the same as those in the above-mentioned embodiment [1]. When the angle θ from the position of the monopole portion 2 in which the feeding portion 3 is provided in a tip portion 6 of the monopole portion 2 is varied in the range of approximately 10°-60° as shown in FIGS. 10B and 10C, the radiation resistance Ra varies from 4500 Ω to 1800 Ω (see FIG. 10B), and an inductance L varies from 26 nH to 13 nH (see FIG. 10C). Accordingly, with the chip of Cc=1.4 pF, it resonates with the inductance L=20 nH at fo=953 MHz, referring to the above-mentioned Eq.(1). Therefore, it is seen that θ=32° should be selected referring to FIG. 10B.

Thus, it becomes unnecessary to provide the folded portion depending on an electric capacitance required for the chip 3.

Figure 11A:
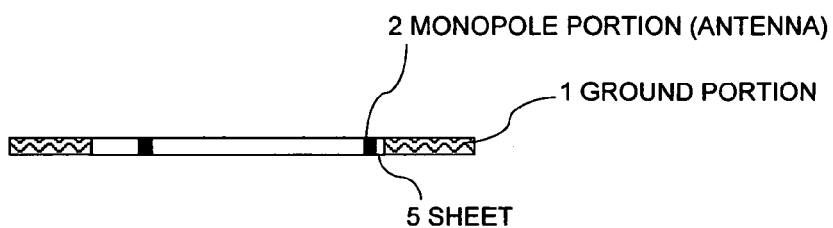
FIGS. 11A and 11B are diagrams of A-A sectional view and top view showing an embodiment [3] of an RFID tag according to the present invention.
Figure 11B:
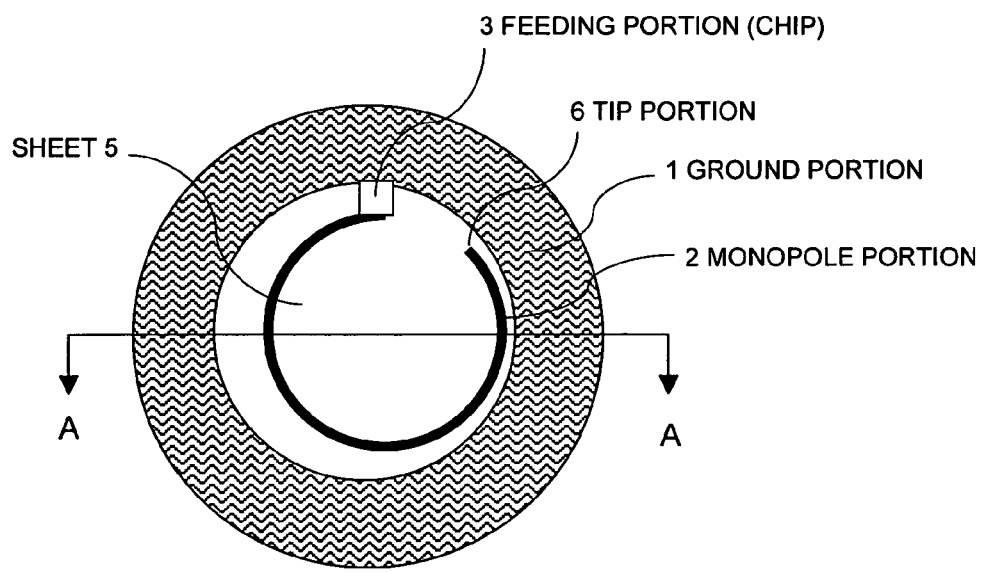

⊙Embodiment [3] of RFID Tag: FIGS. 11A and 11B

While the ground portion 1 and the monopole portion 2 are arranged in a concentric fashion in the embodiment [2] shown in FIGS. 9A and 9B, the center of the monopole portion 2 is deviated from the center of the ground portion 1, namely, the monopole portion 2 is decentered from the ground portion 1 so as to locate a vicinity of the feeding portion 3 away from the ground portion 1 and to bring a vicinity of the tip portion 6 near to the ground portion 1 in this embodiment [3].

An operation principle of the case thus modified will now be described referring to FIGS. 12A and 12B.

Figure 12A:
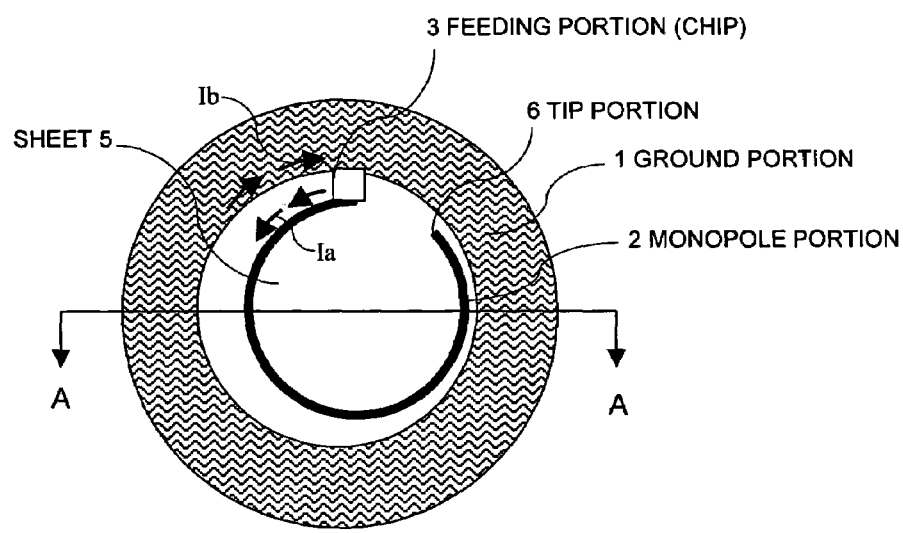
FIGS. 12A and 12B are diagrams illustrating an operation principle of an embodiment [3] of an RFID tag according to the present invention.
Figure 12B:
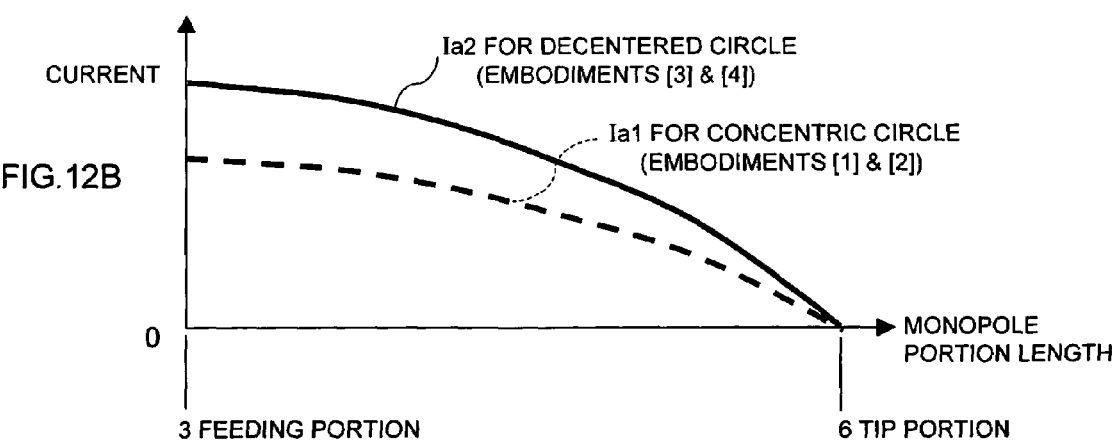

Firstly, when the ground portion 1 and the monopole portion 2 are arranged in the concentric fashion, current Ia concentrates at a vicinity of the feeding portion 3 at the base of the monopole portion 2, where the current assumes 0 at the tip portion 6 as shown by a dotted line of FIG. 12B. At this time, as shown in FIG. 12A, current Ib which is opposite in the direction to the current Ia flowing through the monopole portion 2 flows in the ground portion 1. The magnetic fields arising from the current Ia and Ib in opposite directions cancel with each other, resulting in diminishing the flowing current Ia.

Therefore, as shown in FIG. 12A, the monopole portion 2 is decentered from the ground portion 1 so as to separate the vicinity of the feeding portion 3 from the ground portion 1 and to bring the vicinity of tip portion 6 near to the ground portion 1. Since the effect of canceling the magnetic fields with each other can be sustained in this way, the current Ia2 in a case where the monopole portion is decentered shown by the solid line in FIG. 12B becomes larger than the current Ia1 in the concentric case.

Thus, the current assumes 0 at the tip portion 6 of the monopole portion 2, and resultantly the current over the monopole portion 2 becomes larger (Ia2>Ia1), so that the gain in a far field becomes large.

FIGS. 13A-13C show a dimension example and calculation results of the electromagnetic field simulator of the embodiment [3]. In this example, as shown in FIG. 13A, the center of the ring of the monopole portion 2 is shifted to the right from the center of the ring of the ground portion 1 by 2.5 mm, and a gap "d" between the monopole portion 2 in the vicinity of the tip portion 6 of the monopole portion 2 and the ground portion 1 is brought near to 0.5 mm.

In this dimension example, as shown in FIGS. 13B and 13C, e.g. the chip of Cc=1.4 pF resonates with L=20 nH as mentioned above. Therefore, it is preferable that the angle θ=78°. Also, the resonance can be realized with θ=22° since the chip of Cc=0.7 pF resonates with L=40 nH.

Figure 14A:
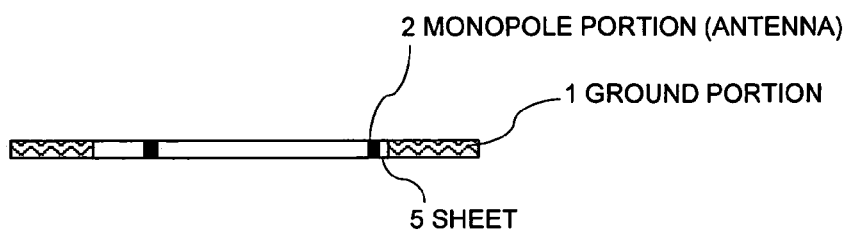
FIGS. 14A and 14B are diagrams of A-A sectional view and top view showing an embodiment [4] of an RFID tag according to the present invention.
Figure 14B:
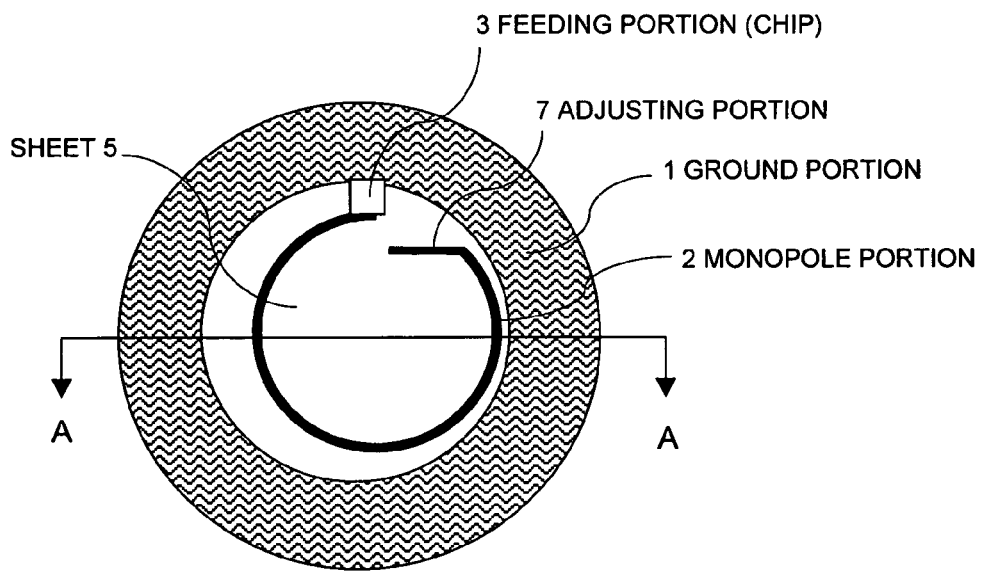

⊙Embodiment [4] of RFID Tag: FIGS. 14A and 14B

This embodiment [4] is different from the embodiment [3] shown in FIGS. 12A and 12B in that an adjusting portion 7 of a length "k" is provided in the tip portion 6 of the monopole portion 2. It is to be noted that although the adjusting portion 7 is provided in a horizontal direction from the tip portion 6 toward the center of the monopole portion 2 in this example, the adjusting portion 7 can be provided in various directions not limited to the horizontal direction.

Figure 15A:
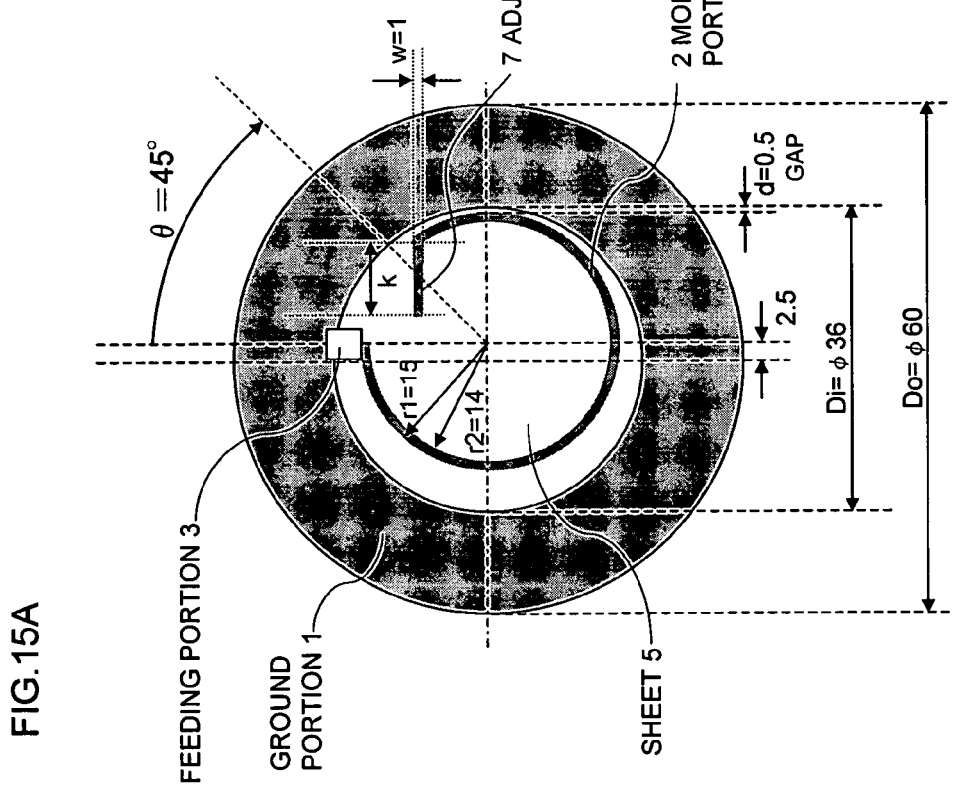
FIGS. 15A-15C are diagrams showing a dimension example and a calculation result by an electromagnetic field simulator of an embodiment [4] of an RFID tag according to the present invention.
Figure 15B:
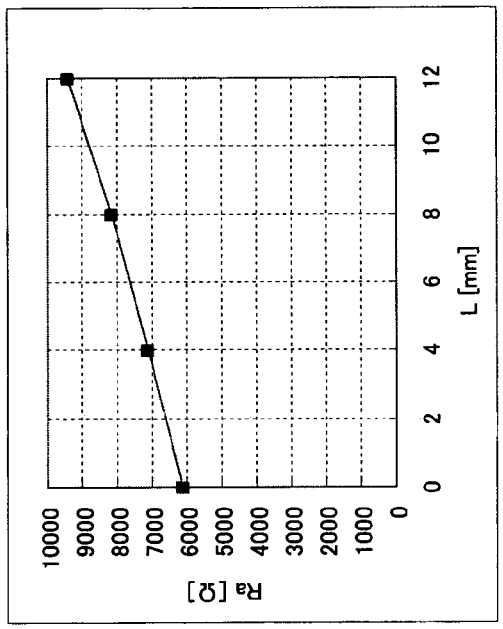
Figure 15C:
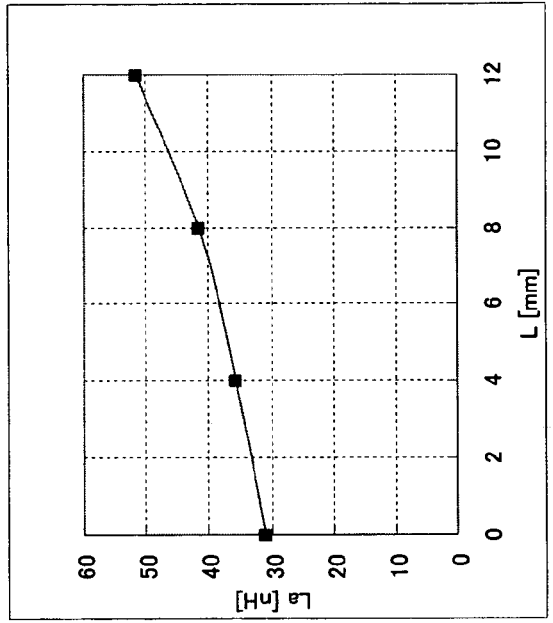

FIGS. 15A-15C show a dimension example and calculation results by the electromagnetic field simulator of the embodiment [4]. In order to match the radiation resistance Ra of the antenna and the inductance component La with the chip 3 of 0.7 pF as shown in FIGS. 14B and 14C respectively for the length "k" (width w=1 mm) of the adjusting portion 7, it is seen that "k" should be 7.2 mm to obtain La=40 nH.

Figure 16:
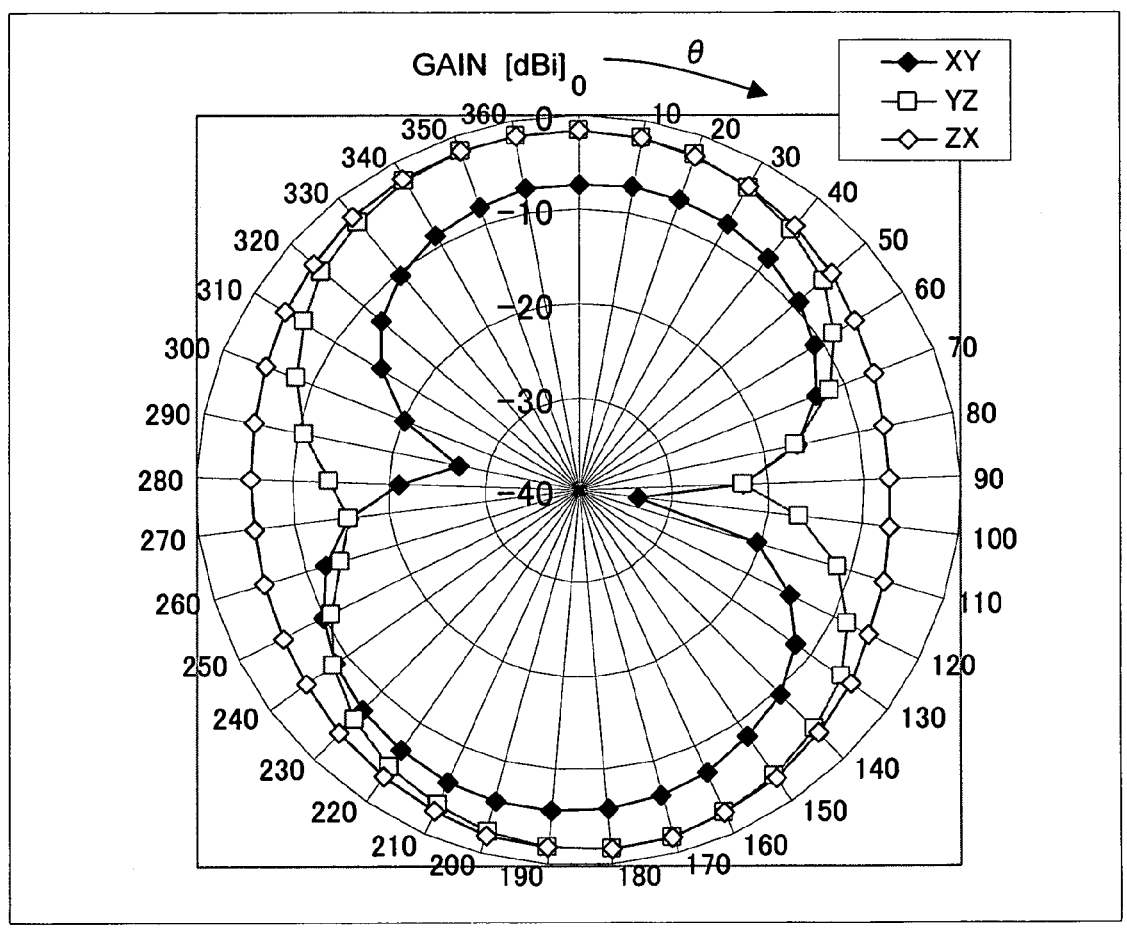
FIG. 16 is a diagram showing an antenna gain of an embodiment [4] of an RFID tag according to the present invention.
Figure 20A:
FIGS. 20A-20C are diagrams showing an antenna example of an RFID tag.
Figure 20B:
Figure 20C:
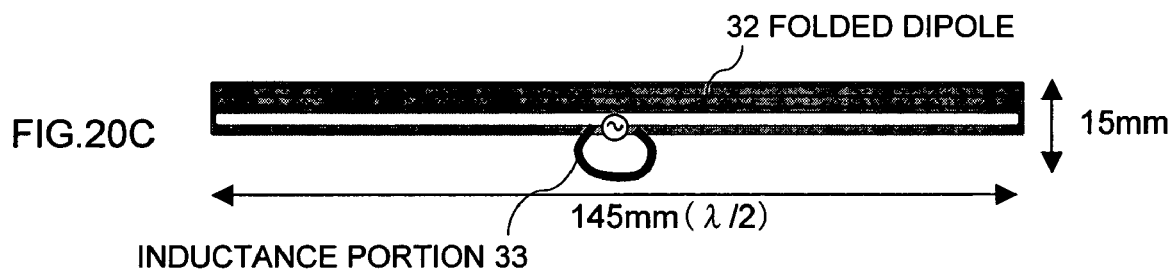

FIG. 16 shows an antenna gain in this case. The antenna gain is −1−−2 dBi in the direction of +z for θ=0 (YZ, ZX), and the communication distance of 67% (−1−2=−3 dBi) of the normal elongate folded dipole (assuming that the gain is 2 dBi) shown in FIG. 20B is obtained. As a result of a trial production and evaluation by actually using the electrically conductive tape, it has been confirmed that the operation with communication distance, 56% of the elongate folded dipole is performed. In the above-mentioned embodiment [1], the antenna gain is −5-6 dBi, which is increased by approximately 4 dB. Also, when trial production results of actual electrically conductive tapes are compared with each other, the communication distance of this embodiment is approximately 1.4 times as long as the communication distance of the embodiment [1].

⊙Embodiment [5] of RFID Tag

Figure 17A:
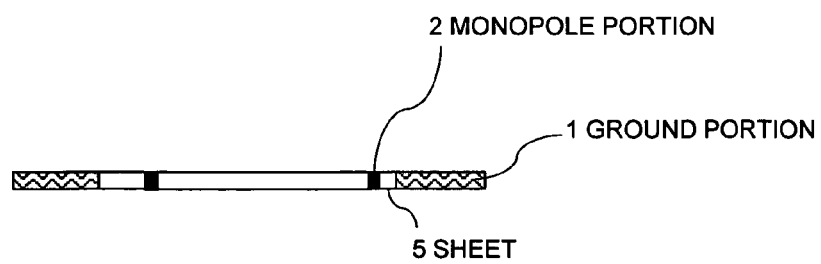
FIGS. 17A and 17B are diagrams of A-A sectional view and top view showing an embodiment [5] of an RFID tag according to the present invention.
Figure 17B:
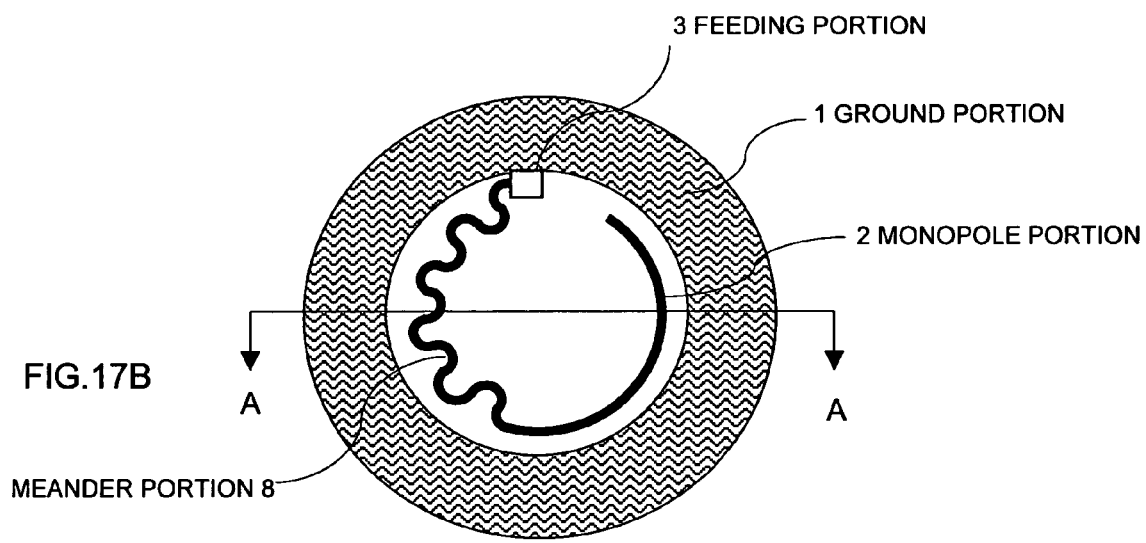
Figure 18:
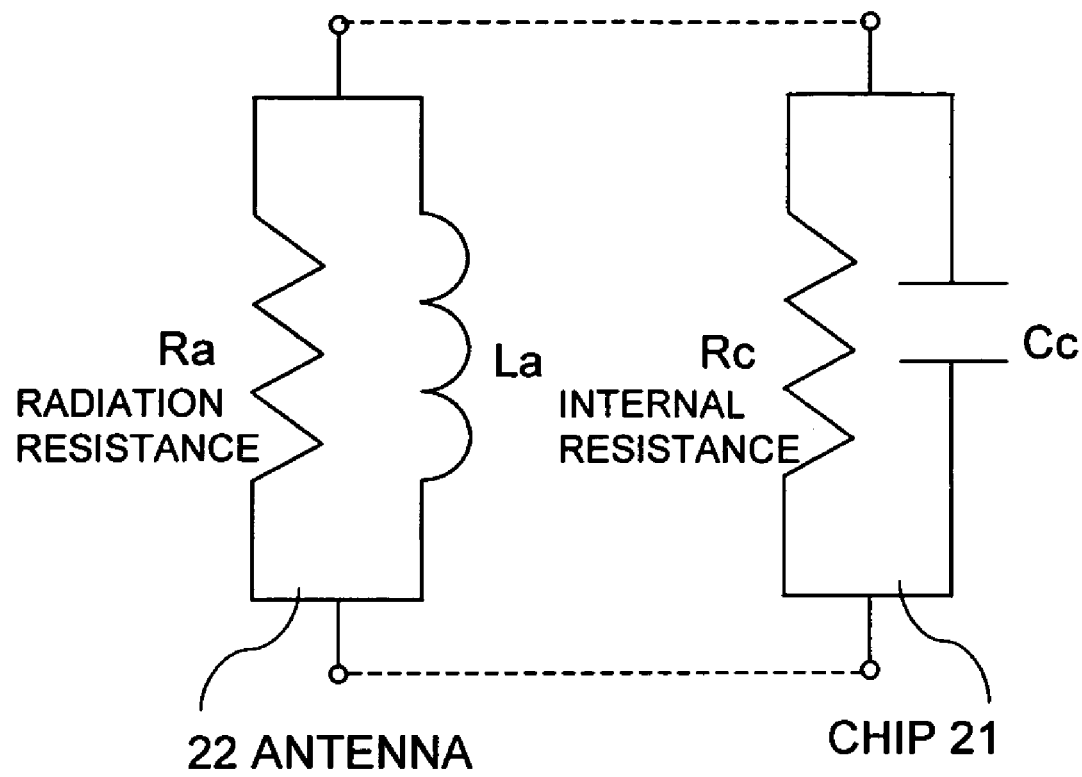
FIG. 18 is a diagram showing a general equivalent circuit of an RFID tag according to the present invention.

Even if a part or all of the monopole portion 2 includes a meander portion 8, as shown in FIGS. 17A and 17B, to utilize the overall length of the monopole, it is needless to say that the characteristic and the effect the same as those of the folded monopole portion can be obtained.

It is to be noted that in this description, the above-mentioned FIGS. 2A, 7A, 8A, and 21A respectively show enlarged sectional view along the line A-A of FIGS. 2B, 7B, 8B, and 21B, so that the dimension of both are not always coincident with each other.

It is to be noted that the present invention is not limited to the above-mentioned embodiments and it is obvious that various modifications may be made by one skilled in the art based on the recitation of the claims.

What is claimed is:

1. An RFID tag comprising:
    a ground portion attached to a magnetic recording medium so as to be electromagnetically coupled to a metal surface inside the magnetic recording medium in a high-frequency band;
    a monopole portion provided on a same plane as the ground portion and inside the ground portion; and
    a feeding portion provided between one end of the monopole portion and the ground portion, and capable of mounting thereon a chip.

2. The RFID tag as claimed in claim 1, wherein the ground portion has a ring shape.

3. The RFID tag as claimed in claim 2, wherein the monopole portion is bent along the ring shape.

4. The RFID tag as claimed in claim 3, wherein the monopole portion has a length for impedance matching with the feeding portion.

5. The RFID tag as claimed in claim 4, wherein the monopole portion has a folded portion for adjusting the length.

6. The RFID tag as claimed in claim 4, wherein the monopole portion has a meander portion for adjusting the length.

7. The RFID tag as claimed in claim 3, wherein the monopole portion has a ring shape which is concentric with the ground portion and has a notched portion at a tip portion.

8. The RFID tag as claimed in claim 3, wherein the monopole portion has a ring shape notched at a tip portion, and the ring shape is decentered from the ground portion so as to locate a vicinity of the feeding portion away from the ground portion and to bring a vicinity of the tip portion near to the ground portion.

9. The RFID tag as claimed in claim 8, wherein an adjusting portion for adjusting a length for impedance matching with the feeding portion is provided at the tip portion of the monopole portion.

10. The RFID tag as claimed in claim 2, wherein the ground portion has an outer diameter larger than an inner diameter of the metal surface on its upper side so as to substantially cover the metal surface, and is attached to the magnetic recording medium separated from the metal surface.

11. The RFID tag as claimed in claim 10, wherein the ground portion is attached on a label surface of the magnetic recording medium.

12. The RFID tag as claimed in claim 2, wherein the ground portion is connected to the metal surface on a same plane as the metal surface and inside the metal surface.

13. The RFID tag as claimed in claim 2, wherein the ground portion is formed integrally with the metal surface.

14. The RFID tag as claimed in claim 1, wherein the ground portion and the monopole portion comprise conductors consisting of any of Cu (Copper), Ag (Gold), and Al (Aluminum), and are fixed on a sheet consisting of any of PET (polyethyleneterephthalate), film, and paper.

15. The RFID tag as claimed in claim 1, wherein the magnetic recording medium comprises a CD (Compact Disc) or a DVD (Digital Versatile Disc).

16. The RFID tag as claimed in claim 1, wherein the metal surface comprises a recording surface.

\* \* \* \* \*